United States Patent [19]
Walker et al.

[11] Patent Number: 5,946,388
[45] Date of Patent: Aug. 31, 1999

[54] METHOD AND APPARATUS FOR PRIORITY QUEUING OF TELEPHONE CALLS

[75] Inventors: Jay S. Walker, Ridgefield; James A. Jorasch, Stamford; Thomas M. Sparico, Riverside, all of Conn.

[73] Assignee: Walker Asset Management Limited Partnership, Stamfort, Conn.

[21] Appl. No.: 08/796,132

[22] Filed: Feb. 6, 1997

[51] Int. Cl.⁶ .............................. H04Q 3/64; H04M 3/42
[52] U.S. Cl. .................. 379/266; 379/93.12; 379/201; 379/265; 379/309
[58] Field of Search ................................ 379/265, 266, 379/309, 211, 93.12, 393, 201

[56] References Cited

U.S. PATENT DOCUMENTS

| | | | |
|---|---|---|---|
| 4,071,698 | 1/1978 | Barger, Jr. et al. . | |
| 4,468,528 | 8/1984 | Reece et al. | 379/266 |
| 4,577,067 | 3/1986 | Levy et al. | 379/88.24 |
| 4,788,715 | 11/1988 | Lee | 379/84 |
| 4,953,204 | 8/1990 | Cuschleg, Jr. et al. | 379/266 |
| 5,006,983 | 4/1991 | Wayne et al. | 379/266 |
| 5,020,095 | 5/1991 | Morganstein et al. | 379/88.23 |
| 5,046,088 | 9/1991 | Margulies . | |
| 5,163,083 | 11/1992 | Dowden et al. | 379/213 |
| 5,166,974 | 11/1992 | Morganstein et al. . | |
| 5,208,848 | 5/1993 | Pula . | |
| 5,278,898 | 1/1994 | Cambray et al. . | |
| 5,299,259 | 3/1994 | Otto | 379/266 |
| 5,299,260 | 3/1994 | Shaio | 379/266 |
| 5,309,505 | 5/1994 | Szlam et al. | 379/266 |
| 5,311,583 | 5/1994 | Friedes et al. . | |
| 5,329,578 | 7/1994 | Brennan et al. | 379/211 |
| 5,329,583 | 7/1994 | Jurgensen et al. . | |
| 5,335,269 | 8/1994 | Steinlicht | 379/265 |
| 5,394,464 | 2/1995 | Hanson et al. | 379/266 |
| 5,444,774 | 8/1995 | Friedes | 379/266 |
| 5,500,889 | 3/1996 | Baker et al. . | |
| 5,506,898 | 4/1996 | Costantini et al. | 379/266 |
| 5,511,112 | 4/1996 | Szlam | 379/266 |
| 5,524,147 | 6/1996 | Bean | 379/309 |
| 5,537,470 | 7/1996 | Lee | 379/266 |
| 5,557,658 | 9/1996 | Gregorek et al. | 379/393 |
| 5,561,707 | 10/1996 | Katz | 379/88.16 |
| 5,590,188 | 12/1996 | Crockett . | |
| 5,646,988 | 7/1997 | Hikawa . | |
| 5,684,872 | 11/1997 | Flockhart et al. . | |
| 5,740,240 | 4/1998 | Jolissaint | 379/266 |

OTHER PUBLICATIONS

PCT International Search Report dated Jul. 30, 1998 for Co–pending Foreign Related Application No. PCT/US98/01665.

Bill Maikranz, "IBM's Callpath Explained", Inbound/Outbound Magazine, Oct. 1989 at p. 15.

Keith Dawson, "The Smart Way to Handle Incoming Callers", Inbound/Outbound Magazine, May 1990 at p. 22.

Keith J. Burke, "Initiating Coverage of the Combination of Digital Systems and ViewStar with a BUY Recommendation", Mosaix, Inc., Apr. 8, 1997.

Ives, "Let Customers Reach The Right Person Faster," Inbound/Outbound Magazine, pp. 20 and 23–25, Jul. 1990.

*Primary Examiner*—Krista M. Zebe
*Assistant Examiner*—Scott Wolinsky
*Attorney, Agent, or Firm*—Jeffrey L. Brandt; Charles A. Rattner

[57] ABSTRACT

A PBX/automatic call distributor (ACD) system allows callers to exercise control over their rank order within a phone queue. The ACD accesses a call database and develops offers to be made to callers, based upon a caller reaching a particular position in a queue or at a position at which the call is first placed in the queue. An interactive voice response unit (IVRU) is employed to offer a caller a chance to move up in the queue in return for a payment. If the caller wishes to accept the offer, the caller responds by using the touch tone keys of his/her telephone and entering a credit card number, an account number, or indicating some other method of payment. The ACD then changes the rank order of the caller's call within the phone queue and alters the rank position of other calls within the queue, accordingly.

246 Claims, 8 Drawing Sheets

| PHONE NUMBER | CALL TRACKING NUMBER | CALL RANK | TIME RECEIVED | ACCEPTANCE TRACKING NUMBER | OFFER TRACKING NUMBER |
|---|---|---|---|---|---|
| | | | | | |
| | | | | | |

FIG. 4A

| CALL TRACKING NUMBER | PHONE NUMBER | OFFER TRACKING NUMBER | OFFER DESCRIPTION | TIME OF OFFER | NUMBER OF OFFERS MADE |
|---|---|---|---|---|---|
| | | | | | |
| | | | | | |

FIG. 4B

| CALL TRACKING NUMBER | PHONE NUMBER | OFFER TRACKING NUMBER | PAYMENT METHOD | PAYMENT DATA | TIME OF OFFER ACCEPTANCE |
|---|---|---|---|---|---|
| | | | | | |
| | | | | | |

FIG. 4C

METHOD AND APPARATUS FOR PRIORITY QUEUING OF TELEPHONE CALLS

FIELD OF THE INVENTION

The present invention relates to a system and method for controlling the queuing of incoming telephone calls and, more particularly, to a system and method for enabling a caller to alter an assigned position of a call in a queue.

BACKGROUND OF THE INVENTION

As more and more companies offer telephone access to their customer service, sales and support staffs, problems associated with waiting on hold have grown. Such problems include, for example, excessively long waits, full queues that can not accept additional callers, and accidental disconnects. These problems have engendered a high level of frustration and ill will amongst callers. Some companies now routinely inform calling customers on hold how long a current wait is expected to last before a service representative will be available to take the call.

Some companies offer various levels of speed-of-answer services to their customer base. This is especially important where time-on-hold can tie up valuable business activities of the caller. Thus, a company might offer one telephone number for service which guarantees no more than a five-minute wait, and another less expensive number which guarantees that an agent will be available in no more than a 15 minute wait. Incoming callers are thus charged more for the shorter response guarantee time than for calls with a longer response guarantee time.

To implement an automatic call answering/queuing system of the type described above, manufacturers offer a range of products. Ordinarily, automatic call answering systems include a private branch exchange (PBX) which processes an incoming call and identifies the number dialed via a dialed number identification service function (DNIS). Once that information is stored, the PBX checks a routing database for DNIS routing instructions and routes the call to an automatic call distributor (ACD). The ACD logs each call in memory and assigns each call a rank, based on the order in which the call arrived. If there are currently N calls in a queue, the ACD normally assigns a next call received from the PBX to position N+1 in the queue.

When the PBX indicates to the ACD that an agent is available to answer a call, the call resident at the top of the queue in the ACD is removed and sent to the PBX, which takes the corresponding incoming line off hold and routes the call to the available agent. The ACD then moves up each call in the queue and the process continues.

If the system is provided with an automatic voice response capability, it includes an interactive voice response unit (IVRU). The IVRU is utilized to intermittently communicate with incoming callers, indicating position in the queue and waiting time until the call is expected to be answered.

U.S. Pat. No. 5,020,095 to Morganstein et al. describes a call processing apparatus which queues calls that are waiting to be connected to a service position. The apparatus calculates a queue position and wait time and transmits the queue data to the calling party. U.S. Pat. No. 5,444,774 to Friedes describes an interactive queuing system for a call center and collects initial information from the caller while the call is in the holding queue. The information input by the caller enables the apparatus to query a database and to retrieve additional information needed to service the call. That information is then displayed to a next available agent as the call is received by that agent.

U.S. Pat. No. 5,561,707 to Katz describes a telephone interface system which is adapted to select or qualify a set of callers, acquire data from the callers in the set and statistically analyze the acquired data. U.S. Pat. No. 4,788,715 to Lee describes an automatic call distributor system wherein calls waiting in a queue are informed of expected wait time until connection to an agent. The announcements are periodically updated to reassure customers that they are progressing in the queue. The customers are also given the opportunity to leave a message if they do not wish to wait in the queue.

While the prior art describes a method for enabling a caller to arrange, prior to a call, for access to a priority queuing arrangement, there is need for a system which will enable a caller to alter his/her position in a phone queue. For instance, a caller's data processing system may have become inoperative, resulting in a virtual shutdown of the related business. Applicants know of no provision in the prior art for enabling a caller who is placed in a phone queue to arrange for any movement within the queue.

SUMMARY OF THE INVENTION

Accordingly, it is an object of this invention to provide a phone queuing system and method which enables a caller to move his/her call position in a queue.

It is another object of this invention to provide a system and method for enabling a PBX/ACD system to offer to incoming callers the ability to change their positions within a queue in which their respective calls have been placed.

In accordance with the invention, a PBX/ACD system allows callers to exercise control over their rank order within a phone queue. The ACD accesses a call database and develops offers to be made to callers, based upon a caller reaching a particular position in a queue or at a position at which the call is first placed in the queue. An IVRU is employed to offer a caller a chance to move up in the queue in return for a payment. If the caller wishes to accept the offer, the caller responds by using the touch tone keys of his/her telephone and entering a credit card number, an account number, or indicating some other method of payment. The ACD then changes the rank order of the caller's call within the phone queue and alters the rank position of other calls within the queue, accordingly.

BRIEF DESCRIPTION OF THE DRAWINGS

FIG. 4a is a schematic drawing showing a call order database maintained within the PBX of FIG. 2.

FIG. 4b is a schematic drawing of an offer database maintained within the ACD of FIG. 3.

FIG. 4c is a schematic drawing of an acceptance database located within the ACD of FIG. 3.

DETAILED DESCRIPTION OF THE INVENTION

Figure 1:
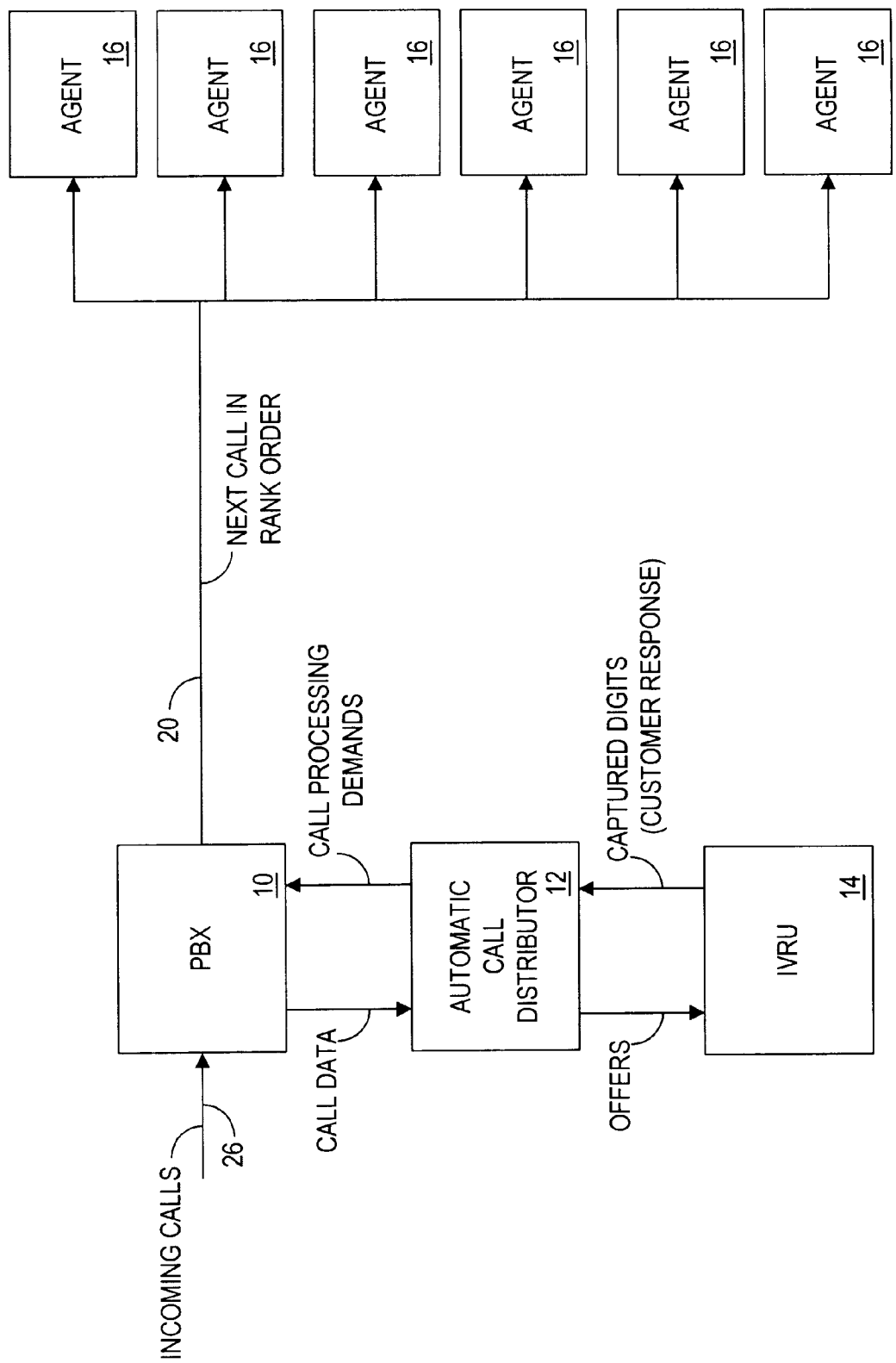
FIG. 1 is a block diagram illustrating a priority phone queuing system that incorporates the invention.

Referring to FIG. 1, a priority phone queuing system comprises a PBX 10, an ACD 12 and an IVRU 14. PBX 10 receives incoming calls and is, in turn via a trunk 20, connected to a plurality of agent terminals 16. In the description which follows, it will be assumed that all agent terminals 16 are busy and that PBX 10 cannot respond to an incoming call by making a direct connection to an agent. As a result, PBX 10 is forced to place an incoming call on hold and to provide call data to ACD 12. In response, ACD 12 places the incoming call in a queue, in the order received. Thereafter, when PBX 10 determines that an agent terminal is available, it so instructs ACD 12 which provides the next call at the top of the queue back to PBX 10, which then takes the corresponding incoming line off hold and connects the caller to the available agent.

After the call has been listed in the queue and in accord with preset criteria, ACD 12 instructs IVRU 14 to make a queue movement offer to a caller and to await a response thereto from the caller. If IVRU 14 receives an acceptance of the queue movement offer, it records the caller's identifier and payment information, e.g., account number, credit card number, etc. . . . and provides that information to ACD 12. In response, ACD 12 moves the call to a new rank within the call queue and the process continues.

IVRU 14 can be instructed by ACD 12 to make the queue movement offers either upon initial queuing of a call, when a call reaches an Nth position in a queue, periodically, or upon some other basis chosen by the user.

Figure 2:
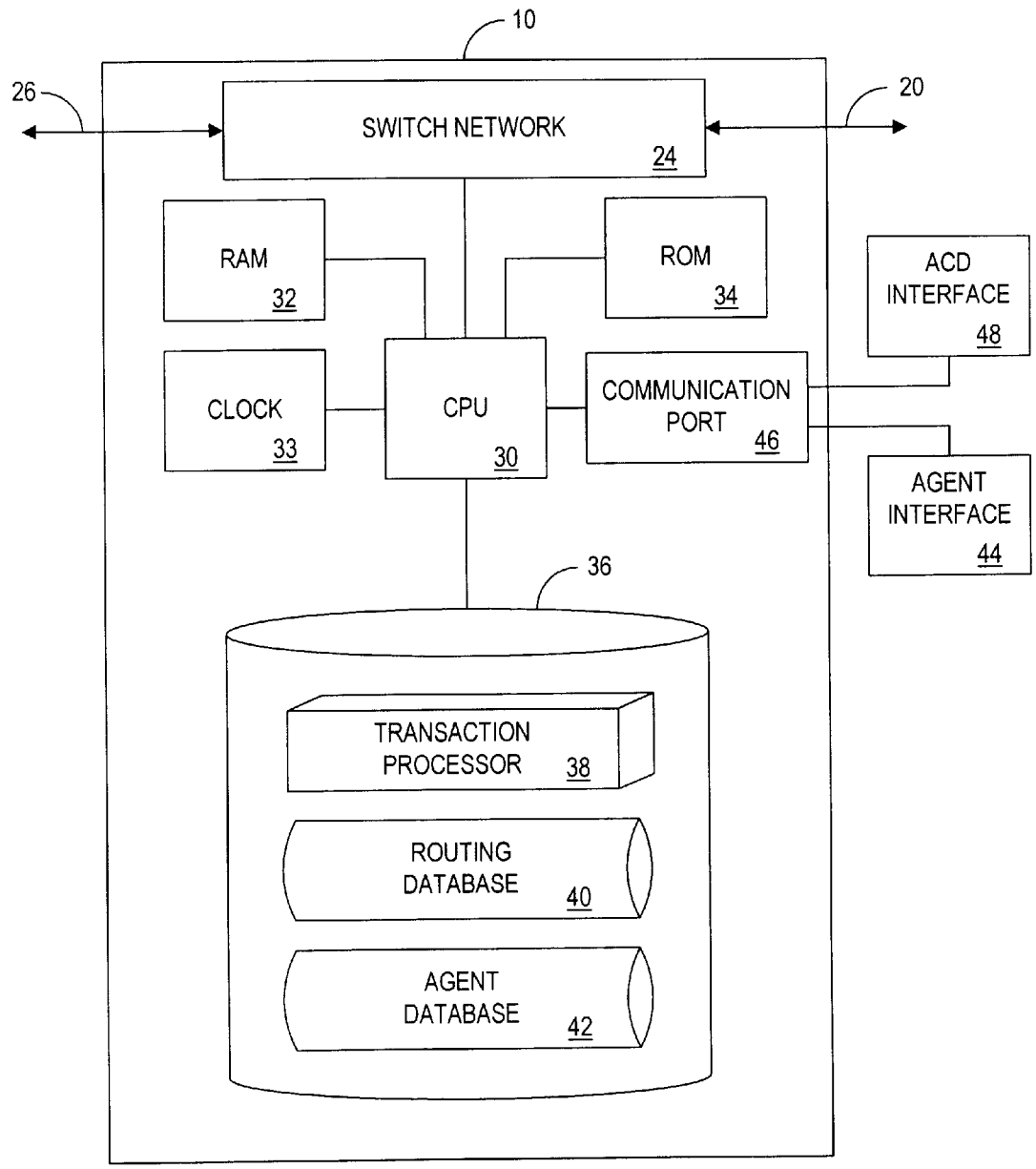
FIG. 2 is a block diagram of a private branch exchange (PBX).

Turning to FIG. 2, PBX 10 comprises a conventional switch network 24 which receives incoming calls via trunk 26 and provides outgoing connections to various ones of agent terminals 16 (FIG. 1) via trunk 20. Control of switch network 24 is exerted by central processing unit (CPU) 30 which is, in turn, controlled by procedures stored in random access memory (RAM) 32 and read-only memory (ROM) 34.

Control procedures and databases used by CPU 30 are held in data storage device 36 (e.g. a hard disk drive). Stored therein are a transaction processor routine 38, a routing database 40 and an agent database 42. CPU 30 is connected to receive input from a conventional clock 33. Transaction processor routine 38, when downloaded to RAM 32, enables handling of incoming calls and control of switch network 24. Routing database 40 maintains the necessary internal routing information regarding agent terminals 16 (and any other terminals that are connected to PBX 10). Agent database 42 provides further information regarding each agent terminal and is utilized to enable the routing of control signals and telephone calls between PBX 10 and the individual agent terminals.

PBX 10 controls communications with each of agent terminals 16 via an agent interface 44 and a communication port 46, with the signalling occurring over control wiring (not shown) between the PBX and the agent terminals. The signalling may, in the alternative, be carried on the internal telephone network. An ACD interface 48 enables PBX 10 to communicate with ACD 12 (shown in FIG. 3).

Figure 3:
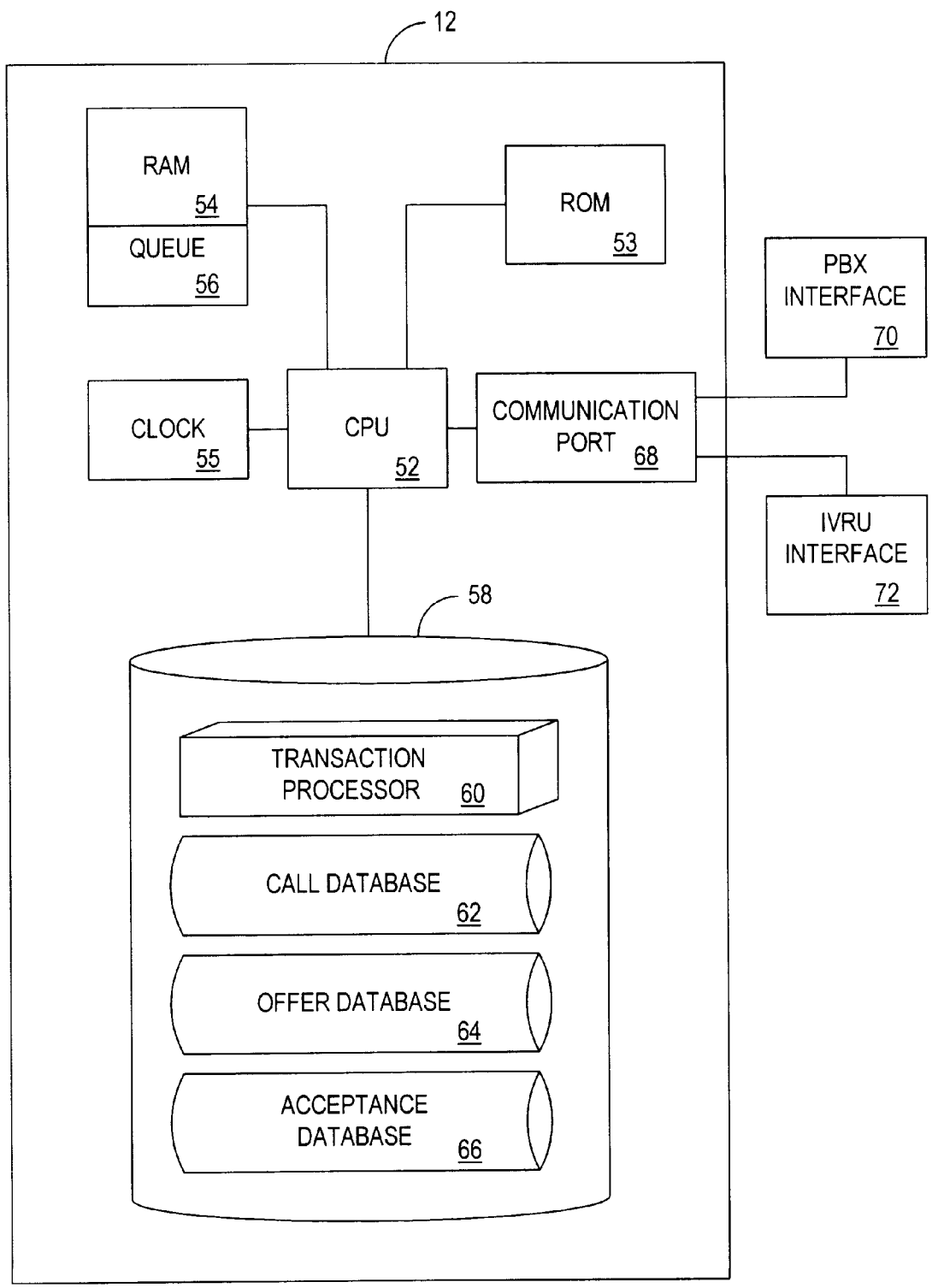
FIG. 3 is a block diagram of an automatic call distributor (ACD).
Figure 5:
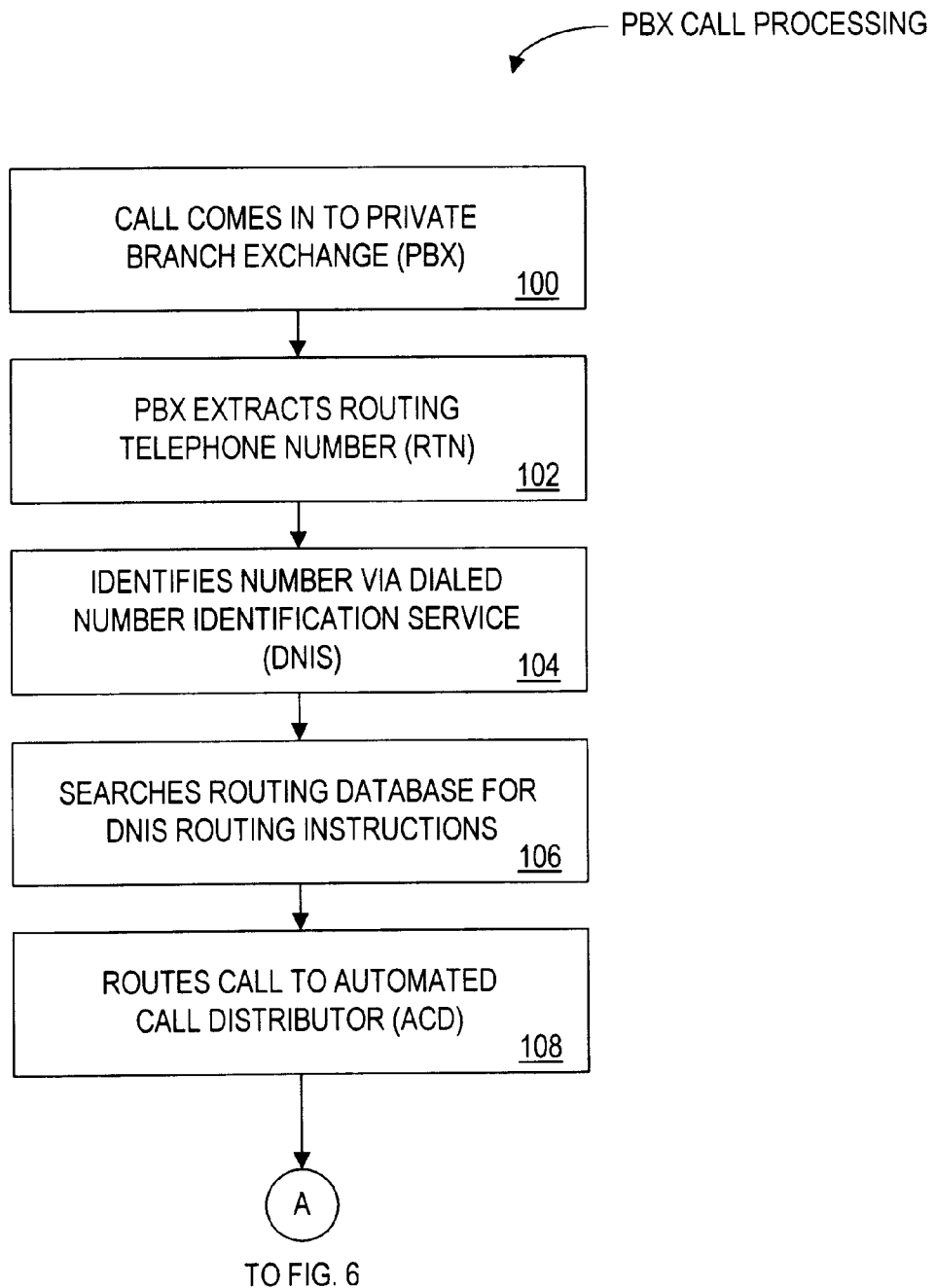
FIG. 5 is a flow chart illustrating the process by which calls are processed in rank.
Figure 6:
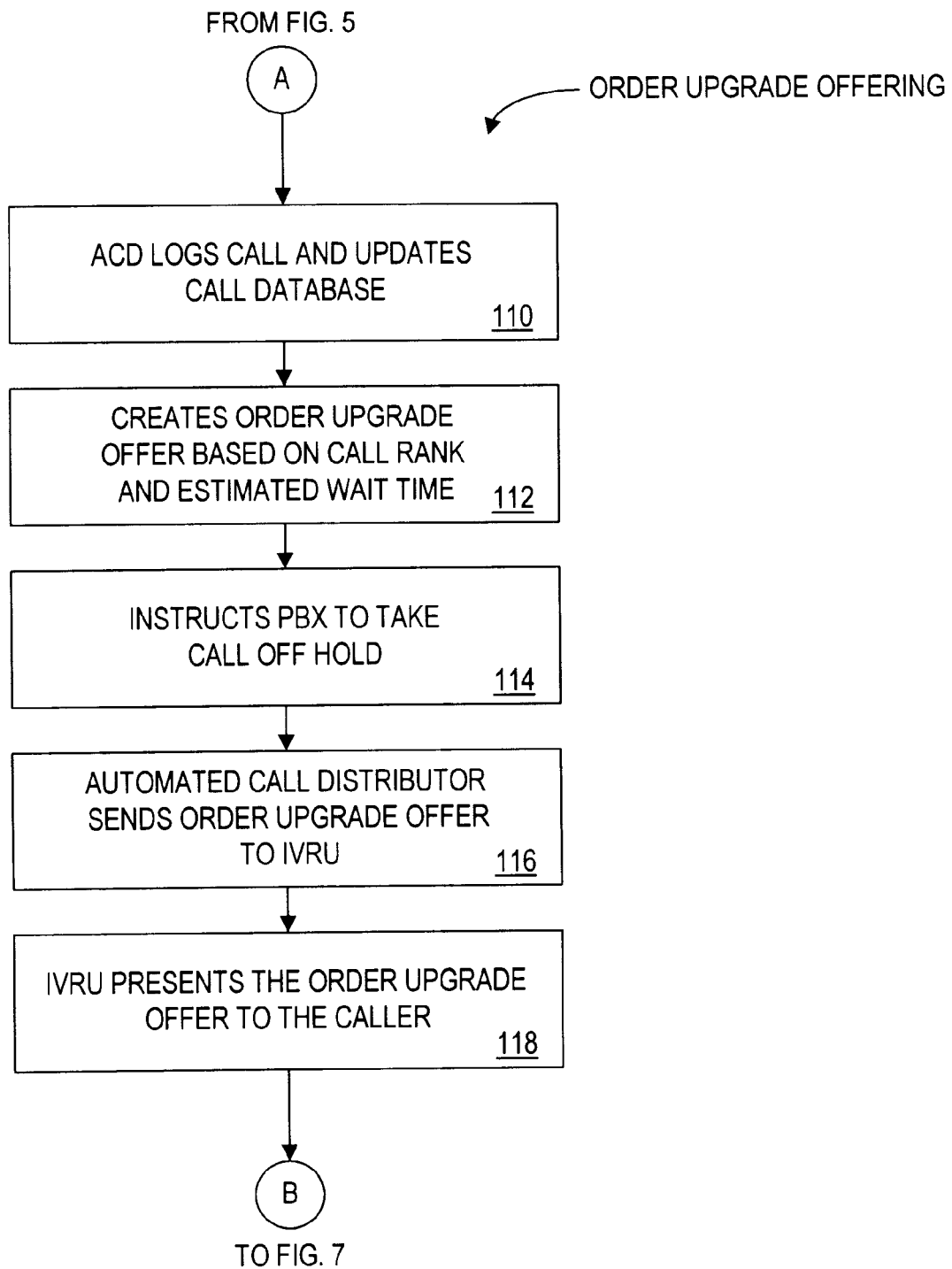
FIG. 6 is a flow chart describing the process by which offers for position upgrades in a queue are created and delivered to a caller.
Figure 7:
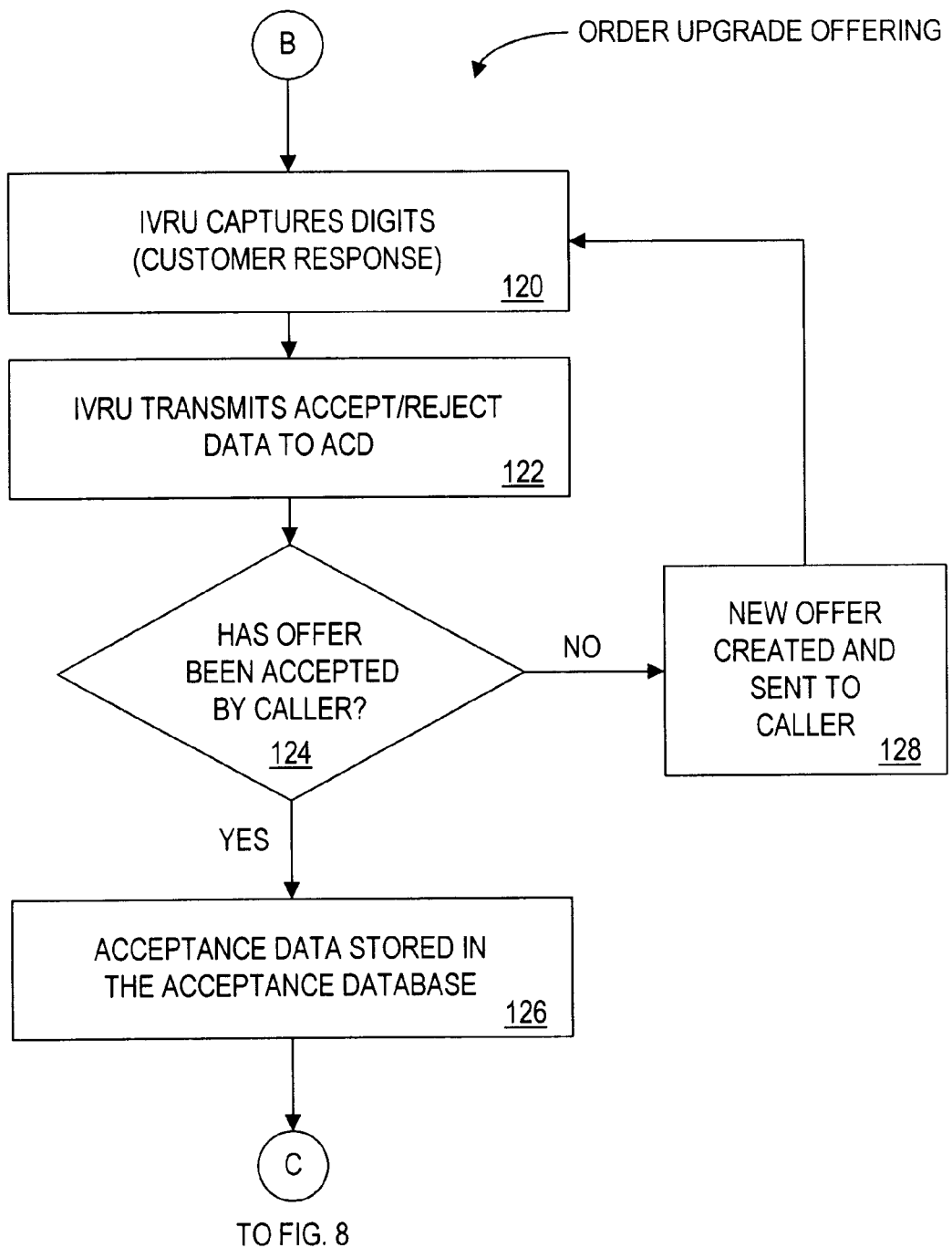
FIG. 7 is a continuation of the flow chart of FIG. 6.
Figure 8:
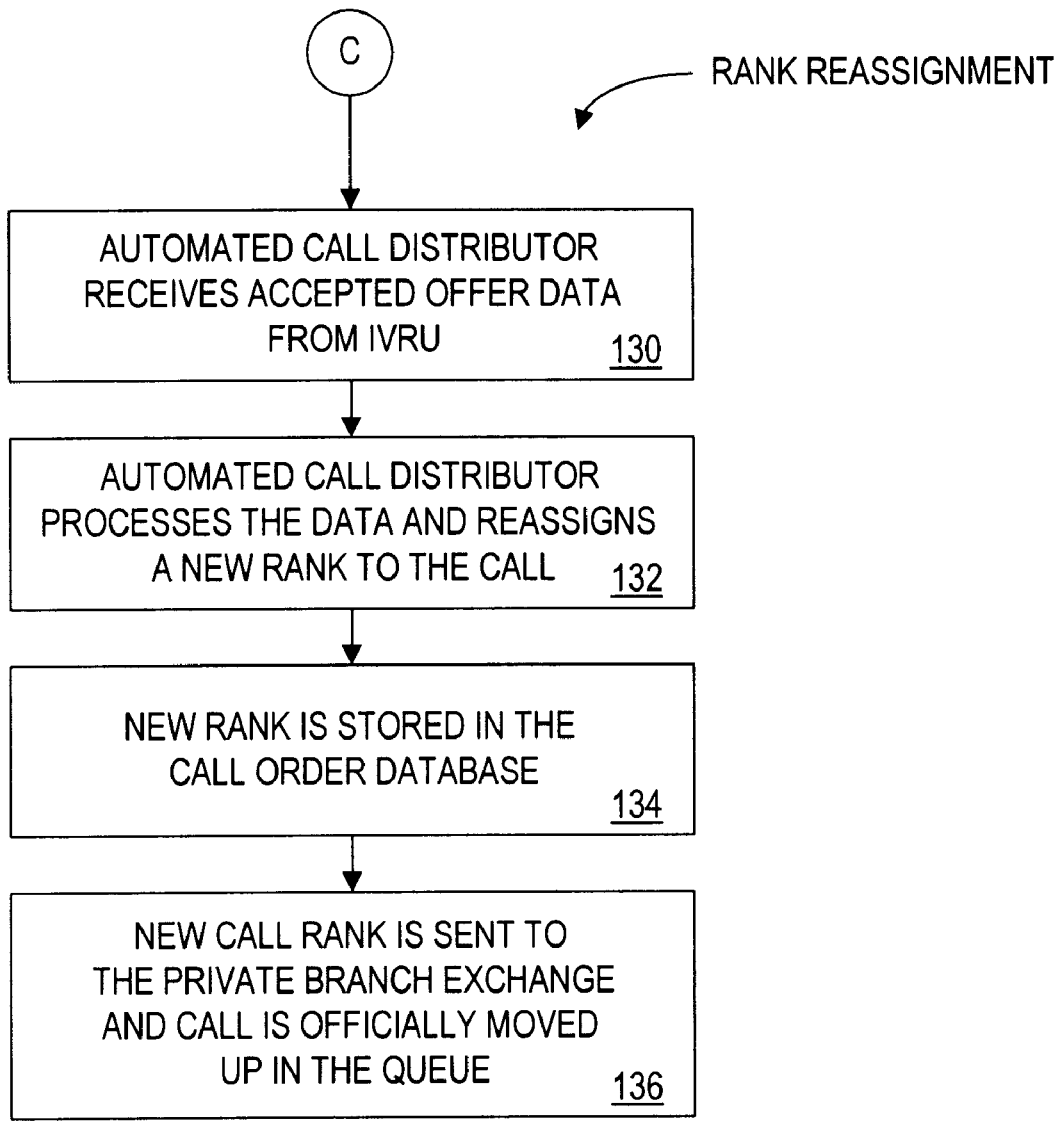
FIG. 8 is a flow chart describing the process by which calls are repositioned in a queue.

Referring to FIG. 3, ACD 12 is controlled by a CPU 52 and includes a clock 55, a ROM 53 and a RAM 54, the latter of which maintains a queue 56 (or queues) of calls awaiting connection to an agent terminal 16. A data storage device 58 includes a transaction processor 60 that enables handling of queue 56 and other functions performed by ACD 12, to be hereafter described. Data storage device 58 further includes a call database 62, an offer database 64 and an acceptance database 66, all of which will be hereafter described in conjunction with the schematic illustrations of FIG. 4a–4c. ACD 12 communicates with PBX 10 via communication port 68 and PBX interface 70, and with IVRU 14 via IVRU interface 72.

It is to be understood that PBX 10, ACD 12 and IVRU 14 are all commercially available units. For instance, the Ameritech Corporation's Call Center provides automated call attendant functions, automatic call distributor functions and interactive voice response functions.

Turning now to FIGS. 4a–4c, three databases which are schematically illustrated aid in the implementation of the invention. Call database 62 (FIG. 4a) includes a listing of the calling phone number; a call tracking number; a call rank value which indicates the position of the call within a call queue; the time the call was received; an offer tracking number and an acceptance tracking number which enables cross references to other databases.

Offer database 64 includes, for each call, an entry for a call tracking number for the call; the phone number of the caller; an offer tracking number; an offer description indicator; a time of offer value and an entry indicating the number of offers made to the caller.

Acceptance database 66 includes, for each call, a call tracking number; the phone number of the caller; an offer tracking number; an indicator regarding payment method; payment data indicating the amount; and the time of offer acceptance.

The data contained within call database 62, offer database 64 and acceptance database 66 are employed to enable ACD 12 and IVRU 14 to determine to which callers a queue movement offer should be made; when the offer should be made; what the offer should be; and to handle the response of the caller to an offer.

It will be understood that the above-described databases are intended to illustrate one embodiment of the present invention. Many alternative database structures and methods of performing the desired functions will be apparent to those skilled in the art.

Referring to the flow diagrams of FIGS. 5–8, the procedure employed by the invention will be described. When a call is received by PBX 10 (box 100), PBX 10 determines the callee's telephone number, i.e., extension (box 102) and identifies the route thereto by accessing a dialed number identification service (DNIS) (box 104). Once the routing information is obtained from the DNIS, (box 106), the call is put on hold and data regarding the call is routed to ACD 12 (box 108).

ACD 12 logs the call and updates its call database (box 110) by establishing an entry for the call, placing the call in call queue 56, and recording the necessary data in call database 62. Thereafter, a rank, or queue position, upgrade offer is created, which in the present embodiment is based upon (i) the position of the call in call queue 56 (i.e., call rank) and (ii) the estimated wait time before the call is expected to be answered (box 112). The queue position upgrade offer tells the caller that a repositioning will be made of the call in the queue to a higher rank, upon acceptance by the caller of the offer and indication of a willingness to make the required payment.

Once the queue position upgrade offer is created, ACD 12 instructs PBX 10 to take the call off hold (box 114) and send the queue position upgrade offer to IVRU 14 (box 116). IVRU 14 then transmits (through PBX 10 and ACD 12) the offer to the holding call line (box 118).

Thereafter, IVRU 14 captures the customer response either accepting or declining the offer (box 120). The acceptance/rejection of the offer is then transmitted to ACD 12 (box 122). If the offer has been accepted by the caller (decision box 124), the acceptance is stored in acceptance database 66 (box 126). If the offer has been declined, another offer is created and sent to the caller (box 128). The new offer will generally await the expiration of an additional time period, at which time it will be dispatched to the caller and the process will then repeat.

Assuming acceptance of the offer, ACD 12 receives the acceptance data from IVRU 14 (box 130) and assigns a new rank to the call (box 132). The new rank is stored in the call order database (box 134) and the call is moved up to the new rank position in queue 56 (box 136).

The above description has assumed that the call will be moved ahead in position in the same queue. An alternative is to move the call from the queue in which it is positioned to a priority queue where there is a guarantee of response within a set of period of time. For example, a customer waiting for technical support can be offered the option of waiting for a company's own representatives (for which there is no charge), or can be switched to an outside private service where there is a guarantee of a response in less than a predetermined time, but requiring a charge for the service.

It will be understood that the offer terms are selected dependent on the circumstances of a given calling situation. For example, in customer service situations where the work flow of a caller may be dependent on the information to be obtained through the call, offers to change position in the queue may be made on a frequent basis and for a significant charge. A graduated fee may be provided from which a caller may select one of many available positions in the queue. An emergency option may be offered wherein, for a predetermined charge, a caller is guaranteed to be moved to the next in line for a response.

In situations where a change in position may not be as desirable to a caller, offers to change position may be made less frequently and/or for a lesser charge.

In yet another embodiment of the present invention, callers may be offered an option to bid for a desirable position in the calling queue. For example, in a situation where a limited number of sporting event tickets are made available for sale by telephone, callers may be offered an option to bid on a relative position within the queue. In such circumstances, while the cost of the tickets may be relatively low, ticket availability will still be limited to those whose position in the queue permit their purchase before they are sold out. In such circumstances, callers may wish to exercise an option to bid on a more desirable position within the queue.

It will be apparent that an almost infinite variety of terms can be used to implement the offer, depending on the particular purpose to be suited.

It will further be understood that the hardware implementation of the system may be varied, depending on the environment. In any event, irrespective of the hardware configuration, the functions described above need to be accomplished to carry out the invention. For example, the PBX may be entirely omitted if the PBX functionality is incorporated into the VRU or the ACD. Thus, incoming calls could go directly to the VRU, which would be, in turn, connected to the ACD or vice-versa.

It should be understood that the foregoing description is only illustrative of the invention. Various alternatives and modifications can be devised by those skilled in the art without departing from the invention. For instance, performance of the invention may be accomplished under software control which is loaded from one or more media disks, with the media disks including the necessary code to cause processing means to carry out the invention. Accordingly, the present invention is intended to embrace all such alternatives, modifications and variances which fall within the scope of the appended claims.

We claim:

1. A method for call processing, comprising the steps of:
   (a) arranging call identifiers in a queue in dependence upon a time of receipt of calls corresponding thereto;
   (b) in accordance with a criteria, providing a message to a caller, whose call identifier is present in said queue, said message offering an option for the caller's call to receive an earlier answer in exchange for a payment; and
   (c) responding to said caller's acceptance of said offer by moving said caller's call identifier within said queue.

2. The method as recited in claim 1, wherein step b) comprises the further steps of:
   b1) measuring a time delay expected before a response is expected to be available for the call corresponding to a call identifier; and
   b2) if the time delay expected before a response exceeds a time delay threshold, presenting said message to said caller.

3. The method as recited in claim 1, wherein step b) comprises the further steps of:
   b1) determining a rank position of said call in said queue; and
   b2) if the rank position of said call exceeds a preset value, presenting said message to said caller.

4. The method as recited in claim 1, wherein step b) comprises the further step of:
   b1) offering to said caller an option to bid against other callers for a relative position within said queue.

5. The method as recited in claim 1, wherein step c) further comprises:
   c1) placing said call identifier at a position in said queue that assures an earlier response.

6. A system for processing of received calls directed to a plurality of agents, comprising:
   call distribution means for arranging call identifiers in a queue in dependence upon a time of receipt of calls corresponding thereto and operational in accordance with predetermined criteria, for outputting a message transmission signal;
   voice response means operative in accordance with said message transmission signal from said call distribution means, for providing a message to a caller whose call identifier is present in said queue, said message offering an option for the caller's call to receive an earlier response in exchange for a payment, and for informing said call distribution means of said caller's acceptance of said offer; and
   said call distribution means responsive to said informing for moving said caller's call identifier in said queue so as to enable said caller's call to be answered in a shorter period than if the offer had not been accepted.

7. The system as recited in claim 6, wherein said predetermined criteria is determined by said call distribution means measuring a probable time delay before a response is expected to be available for the call corresponding to a call identifier; and if the time delay expected before a response exceeds a time delay threshold, causing said voice response means to present said message to said caller.

8. The system as recited in claim 6, wherein said predetermined criteria is determined by said call distribution means determining a rank position of said call in said queue and if the rank position of said call exceeds a preset value, causing said voice response means to present said message to said caller.

9. The system as recited in claim 6, wherein said predetermined criteria comprises offering to all callers an option to bid against other callers for relative position within said queue.

10. An automatic call distributor operative in combination with a voice response unit to process received calls directed to a plurality of agents, comprising:
   a) means for arranging call identifiers in a queue in dependence upon a time of receipt of calls corresponding thereto;
   b) means, operational in accordance with predetermined criteria, for outputting a message transmission signal which causes said voice response unit to provide a message to a caller, whose call identifier is present in said queue, said message offering an option for the caller's call to be moved in said queue in exchange for a payment; and
   c) means responsive to said means b) indicating said caller's acceptance of said offer, by moving said caller's call identifier in said queue so as to enable said caller's call to be answered in a shorter period of time than if the offer had not been accepted.

11. The automatic call distributor as recited in claim 10, where in said p redetermined criteria is determined by said means b) measuring a probable time delay before a response is expected to be available for the call corresponding to a call identifier; and if the time delay expected before a response exceeds a time delay threshold, signalling said voice response unit to present said message to said caller.

12. The automatic call distributor as recited in claim 10, wherein said predetermined criteria is based on a rank position of said call identifier in said queue and if the rank position of said call identifier exceeds a preset value, signalling said voice response unit to present said message to said caller.

13. The automatic call distributor as recited in claim 10, wherein said predetermined criteria is based on (i) a time delay anticipated before a response is expected to be available for said call corresponding to a call identifier and (ii) a determining of a rank position of said call in said queue; and
   if the time delay expected before a response exceeds a time delay threshold or if the rank position of said call identifier exceeds a preset value, signalling said voice response means to dispatch said message to said caller.

14. The automatic call distributor as recited in claim 10, wherein said means c) places said call in a further queue which enables an earlier response to said call.

15. A method of accessing a limited availability telephone information provider, comprising the steps of:
   calling said telephone information provider and receiving a position in a queue of other callers awaiting access to said information;
   receiving from said provider an offer to change said position in said queue in exchange for predetermined compensation, said offer including an option to bid for a second position in said queue; and
   responding to said offer.

16. A method in accordance with claim 15, wherein said position in said queue is changed responsive to said responding step.

17. A method in accordance with claim 15, wherein said offer to change said position in said queue enables the call to be answered in a shortened period of time.

18. A method in accordance with claim 15, wherein said offer identifies one of many selectable positions in said queue.

19. A memory media for controlling a computer system to perform call processing, said memory media comprising:
   a) means for controlling said computer system to arrange call identifiers in a queue in dependence upon a time of receipt of calls corresponding thereto;
   b) means operative in accordance with a criteria, for controlling said computer system to provide a message to a caller, whose call identifier is present in said queue, said message offering an option for the caller's call to receive an earlier answer in exchange for a payment; and
   c) means for controlling said computer system to respond to said caller's acceptance of said offer by arranging for said caller's call to be answered in a shorter period than if the offer had not been accepted.

20. The memory media as recited in claim 19, wherein means b) further controls said computer system to:
   b1) measure a time delay expected before a response is expected to be available for said call corresponding to a call identifier; and
   b2) if the time delay expected before a response exceeds a time delay threshold, to present said message to said caller.

21. The memory media as recited in claim 19, wherein means b) further controls said computer system to:
   b1) determine a rank position of said call in said queue; and
   b2) if the rank position of said call exceeds a preset value, to present said message to said caller.

22. The memory media as recited in claim 19, wherein means b) further controls said computer system to:
   b1) offer to every caller the option to bid in competition with other callers for a relative position within said queue.

23. The memory media as recited in claim 19, wherein means c) further controls said computer system to:
   c1) place said call identifier higher in said queue so as to assure an earlier response thereto.

24. The memory media as recited in claim 19, wherein means c) further controls said computer system to:
   c1) place said call in a further queue which assures an earlier response to said call.

25. A method for call processing, comprising the steps of:
   receiving a call from a caller;
   associating the call with a first time period in a queue;
   providing, to the caller, a queue movement offer requiring a payment;
   receiving, from the caller, a response to the queue movement offer; and
   answering the call within a second time period that is shorter than the first time period, if the offer is accepted by the caller.

26. The method of claim 25, and further including the step of transmitting the queue movement offer to the caller in response to a position of the call in a queue.

27. The method of claim 25, and further including the step of transmitting the queue movement offer to the caller in response to an expected time period of the call in a queue.

28. The method of claim 25, wherein the step of answering the call within a second time period includes moving the call to a different position in a queue.

29. The method of claim 25, wherein the step of answering the call within a second time period includes moving the call to a different queue.

30. The method of claim 25, wherein the queue movement offer includes a payment amount.

31. The method of claim 25, and further including the step of receiving an indicator of the payment amount.

32. The method of claim 25, wherein the queue movement offer includes an option to bid for a queue movement.

33. The method of claim 25, wherein the queue movement offer includes an option to move to a top of a queue in exchange for a payment.

34. A method for call processing, comprising:

receiving a call;

transmitting an upgrade offer including a payment amount;

receiving a response to the upgrade offer;

if the response does not indicate an acceptance of the upgrade offer, answering the call within a first time period; and if the response indicates an acceptance of the upgrade offer, answering the call within a second time period that is shorter than the first time period.

35. The method of claim 34, wherein the transmitting step is in response to a position of the call in a queue.

36. The method of claim 34, wherein the transmitting step is in response to an expected time period of the call in a queue.

37. The method of claim 34, wherein the step of answering the call within a second time period includes moving the call to a different position in a queue.

38. The method of claim 37, wherein the step of moving the call to a different position in a queue includes repositioning other calls in the queue.

39. The method of claim 34, wherein the step of answering the call within a second time period includes moving the call to a different queue.

40. The method of claim 34, and further including the step of receiving an indicator of the payment amount.

41. A method for call processing, comprising:

receiving a call;

transmitting an upgrade offer including an option to bid for a queue movement;

receiving a response to the upgrade offer;

if the response does not indicate an acceptance of the upgrade offer, answering the call within a first time period; and if the response indicates an acceptance of the upgrade offer, answering the call within a second time period that is shorter than the first time period.

42. A method for call processing, comprising:

receiving a call;

transmitting an upgrade offer requiring a payment, and if the upgrade offer is declined:

transmitting a second upgrade offer requiring a payment with different terms;

receiving a response to the second upgrade offer;

if the response does not indicate an acceptance of the second upgrade offer, answering the call within a first time period; and if the response indicates an acceptance of the second upgrade offer, answering the call within a second time period that is shorter than the first time period.

43. A method for call processing, comprising:

receiving a call;

placing the call in a queue;

transmitting an upgrade offer including a payment amount;

receiving an acceptance of the upgrade offer; and moving the call up in the queue in response to the received acceptance, thereby moving the call closer to a top of the queue.

44. The method of claim 43, wherein the transmitting step is in response to a position of the call in the queue.

45. The method of claim 43, wherein the transmitting step is in response to an expected time period of the call in the queue.

46. The method of claim 43, and further including the step of receiving an indicator of the payment amount from the caller.

47. A method for call processing, comprising:

receiving a call;

placing the call in a queue;

transmitting an upgrade offer including an option to bid for a queue movement;

receiving an acceptance of the upgrade offer and a bid; and moving the call up in the queue in response to the received acceptance and the bid, thereby moving the call closer to a top of the queue.

48. A method for call processing, comprising:

receiving a call;

placing the call in a queue;

transmitting an upgrade offer including an option to select one of a plurality of available positions in the queue in exchange for a corresponding payment amount;

receiving an acceptance of the upgrade offer; and moving the call up in the queue in response to the received acceptance and the corresponding payment amount, thereby moving the call closer to a top of the queue.

49. A method for call processing, comprising:

receiving a call;

placing the call in a queue, the call having a position in the queue;

transmitting an upgrade offer including a payment amount;

receiving an acceptance of the upgrade offer; and responsive to the acceptance, repositioning the call in the queue to a higher rank.

50. The method of claim 49, wherein the transmitting step is in response to a position of the call in the queue.

51. The method of claim 49, wherein the transmitting step is in response to an expected time period of the call in the queue.

52. The method of claim 49, and further including the step of receiving an indicator of the payment amount.

53. A method for call processing, comprising:

receiving a call;

placing the call in a queue, the call having a position in the queue;

transmitting an upgrade offer including an option to bid for a queue position;

receiving an acceptance of the upgrade offer; and repositioning the call in the queue to a higher rank.

54. A method for call processing, comprising:

receiving a call from a caller;

placing the call in a queue, the call having a position in the queue;

transmitting an upgrade offer requiring a payment, and if the upgrade offer is not accepted:

transmitting periodically a plurality of subsequent upgrade offers, each requiring a payment, to the caller;

receiving an acceptance of one of the plurality of subsequent upgrade offers; and repositioning the call in the queue to a higher rank.

55. A method for call processing, comprising:

receiving a call;

placing the call in a queue, the call having a position in the queue;

transmitting an upgrade offer including a payment amount;

receiving an acceptance of the upgrade offer; and responsive to the acceptance, altering the position of the call in the queue such that the call may be answered in a shorter period of time than if the position had not been altered.

56. The method of claim 55, wherein the transmitting step is in response to a position of the call in the queue.

57. The method of claim 55, wherein the transmitting step is in response to an expected time period of the call in the queue.

58. The method of claim 55, and further including the step of receiving an indicator of the payment amount.

59. A method for call processing, comprising:

receiving a call;

placing the call in a queue, the call having a position in the queue;

transmitting an upgrade offer including an option to bid for a queue position;

receiving an acceptance of the upgrade offer; and altering the position of the call in the queue such that the call may be answered in a shorter period of time than if the position had not been altered.

60. A method for call processing, comprising:

receiving a call;

placing the call in a queue, the call having a position in the queue;

transmitting an upgrade offer including an option to select one of multiple available positions in the queue;

receiving an acceptance of the upgrade offer and a selection of one of the multiple available positions; and altering the position of the call in the queue in accordance with the selection, whereby the call may be answered in a shorter period of time than if the position had not been altered.

61. The method of claim 60, wherein each of the multiple available positions includes a corresponding fee.

62. A method for call processing, comprising:

receiving a call;

placing the call in a queue;

transmitting an upgrade offer including a payment amount while the call is in the queue;

receiving an acceptance of the upgrade offer while the call is in the queue; and moving the call from the queue to a priority queue in response to the acceptance, the priority queue having a guarantee of response within a predetermined time.

63. The method of claim 62, wherein the transmitting step is in response to a position of the call in the queue.

64. The method of claim 62, wherein the transmitting step is in response to an expected time period of the call in the queue.

65. The method of claim 62, and further including the step of receiving an indicator of the payment amount.

66. A method for call processing, comprising:

receiving a call;

placing the call in a queue;

transmitting an upgrade offer including an option to bid for a queue position while the call is in the queue;

receiving an acceptance of the upgrade offer while the call is in the queue; and moving the call from the queue to a priority queue in response to the acceptance, the priority queue having a guarantee of response within a predetermined time.

67. A method for call processing, comprising:

receiving a call;

placing the call in a queue;

transmitting an upgrade offer including a payment amount while the call is in the queue, and if the upgrade offer is not accepted:

transmitting at least one subsequent offer to the caller;

receiving an acceptance of one of the subsequent upgrade offers while the call is in the queue; and moving the call from the queue to a priority queue in response to the acceptance, the priority queue having a guarantee of response within a predetermined time.

68. The method of claim 67, wherein the at least one subsequent upgrade offer is transmitted to the caller a predetermined period of time following the upgrade offer.

69. A method of processing a telephone call, comprising the steps of:

receiving a telephone call from a caller;

placing said telephone call on hold;

transmitting to said caller while said telephone call is on hold an offer to shorten the time period said telephone call will be on hold in exchange for a monetary payment;

responding to said call, if said offer is not accepted, in a first period of time; and responding to said call, if said offer is accepted, in a second period of time shorter than said first period of time.

70. The method of claim 69, wherein said transmitting step is in response to a position of said call in a queue.

71. The method of claim 69, wherein said transmitting step is in response to an expected time period of said call on hold.

72. The method of claim 69, and further including the step of receiving an indicator of said monetary payment.

73. The method of claim 72, wherein said indicator includes an account number.

74. The method of claim 69, wherein said offer includes an option to bid for a shortened period of time on hold.

75. The method of claim 69, wherein said transmitting step includes the step of, if said offer is not accepted, transmitting at least one subsequent offer having a different monetary payment to said caller.

76. The method of claim 75, wherein said step of transmitting at least one subsequent offer is performed a predetermined period of time following said step of transmitting an offer.

77. A method of call processing, comprising the steps of:
receiving a telephone call from a caller;
placing said telephone call on hold including assigning said telephone call a position in a queue;
transmitting to said caller an offer to shorten a time period said telephone call will be on hold in exchange for a payment;
receiving an acceptance of said offer, while said call is on hold, including an indication of said payment; and
shortening, responsive to said step of receiving an acceptance, said time period.

78. The method of claim 77, wherein said transmitting step is in response to a position of said telephone call in said queue.

79. The method of claim 78, wherein said transmitting step is in response to said telephone call reaching a selected position in said queue.

80. The method of claim 78, wherein said transmitting step is in response to the initial placing of said telephone call in said queue.

81. The method of claim 77, wherein said transmitting step is in response to an expected time period of said call on hold.

82. The method of claim 77, wherein said indication of said payment comprises an account number.

83. The method of claim 82, wherein said account number comprises a credit card account number.

84. The method of claim 77, wherein said offer includes an option to bid for a shortened period of time on hold.

85. A method of processing a telephone call, comprising the steps of:
receiving a telephone call from a caller;
placing said telephone call on hold;
transmitting to said caller while said telephone call is on hold an offer to bid against other callers to shorten a time period said telephone call will be on hold;
receiving a response to said offer; and
receiving, if said offer is accepted, an indication of a value of the bid.

86. The method of claim 85, wherein said transmitting step is in response to a position of said call in a queue.

87. The method of claim 85, wherein said transmitting step is in response to an expected time period of said call on hold.

88. The method of claim 85, wherein said step of receiving an indication of a value includes receiving an account number.

89. The method of claim 85, and further including the step of, responsive to an acceptance of said offer, moving a position of said telephone call in a queue.

90. The method of claim 85, and further including the step of, responsive to an acceptance of said offer, moving said telephone call to a priority queue.

91. A method of accessing a telephone service provider, comprising the steps of:
placing a telephone call to a service provider;
receiving a position on hold in a queue with other telephone callers awaiting access to said service provider;
receiving an offer while on hold to decrease a time period in said queue in exchange for a payment;
responding to said offer; and
receiving, if the responding is an acceptance of said offer, a decrease in said time period for access to said service provider.

92. The method of claim 91, wherein said step of responding to said offer further includes providing said payment.

93. The method of claim 92, wherein said step of providing said payment includes providing an account number.

94. The method of claim 91, wherein said offer includes an option to bid against other callers for a decrease in said time period.

95. The method of claim 91, wherein said offer includes an option to select one of multiple available positions in a queue.

96. The method of claim 91, and further including the step of receiving, if said offer is not accepted, at least one subsequent offer having a corresponding payment amount.

97. A method of accessing a telephone service provider, comprising the steps of:
placing a telephone call to a service provider;
receiving a position on hold in a queue with other telephone callers awaiting access to said service provider;
receiving an offer while on hold to bid against other callers to decrease a time period in said queue;
responding to said offer; and
providing, if said responding is an acceptance of said offer, an indication of a value of the bid.

98. The method of claim 97, wherein said indication of a value includes an account number.

99. A system for call processing, comprising:
means for receiving a call from a caller;
means for placing the call in a queue;
means for transmitting a queue movement offer including a payment amount to the caller;
means for receiving a response to the queue movement offer;
means for answering the call within a first time period, if the response to the queue movement offer for the call is not accepted; and
means for answering the call within a second time period that is shorter than the first time period, if the response to the queue movement offer for the call is accepted.

100. The system of claim 99, wherein said means for transmitting further includes means for transmitting the queue movement offer to the caller in response to a position of the call in a queue.

101. The system of claim 99, wherein said means for transmitting includes means for transmitting the queue movement offer to the caller in response to an expected time period of the call in a queue.

102. The system of claim 99, wherein the means for answering the call within a second time period includes means for moving the call to a different position in a queue.

103. The system of claim 99, wherein the means for answering the call within a second time period includes means for moving the call to a different queue.

104. The system of claim 99, and further including means for receiving an indicator of the payment amount.

105. A system for call processing, comprising:
means for receiving a call from a caller;
means for placing the call in a queue;
means for transmitting a queue movement offer including an option to bid for a queue movement to the caller;
means for receiving a response to the queue movement offer;
means for answering the call within a first time period, if the response to the queue movement offer for the call is not accepted; and means for answering the call within a second time period that is shorter than the first time period, if the response to the queue movement offer for the call is accepted.

106. A system for call processing, comprising:

means for receiving a call from a caller;

means for placing the call in a queue;

means for transmitting to the caller a queue movement offer including an option to move to a top of the queue in exchange for a payment;

means for receiving a response to the queue movement offer;

means for answering the call within a first time period, if the response to the queue movement offer for the call is not accepted; and means for answering the call within a second time period that is shorter than the first time period, if the response to the queue movement offer for the call is accepted.

107. A system for call processing, comprising:

means for receiving a call from a caller;

means for transmitting a queue movement offer including a payment amount to the caller;

means for receiving a response to the queue movement offer from the caller;

means, if the response does not indicate an acceptance of the queue movement offer, for answering the call within a first time period; and means, if the response indicates an acceptance of the queue movement offer, for answering the call within a second time period that is shorter than the first time period.

108. The system of claim 107, wherein the means for transmitting is responsive to a position of the call in a queue.

109. The system of claim 107, wherein the means for transmitting is responsive to an expected time period of the call in a queue.

110. The system of claim 107, wherein the means for answering the call within a second time period includes means for moving the call to a different position in a queue.

111. The system of claim 110, wherein the means for moving the call to a different position in a queue includes means for repositioning other calls in the queue.

112. The system of claim 107, wherein the means for answering the call within a second time period includes means for moving the call to a different queue.

113. The system of claim 107, and further including means for receiving an indicator of the payment amount.

114. A system for call processing, comprising:

means for receiving a call from a caller;

means for transmitting a queue movement offer including an option to bid for a queue movement;

means for receiving a response to the queue movement offer from the caller;

means, if the response does not indicate an acceptance of the queue movement offer, for answering the call within a first time period; and means, if the response indicates an acceptance of the queue movement offer, for answering the call within a second time period that is shorter than the first time period.

115. A system for call processing, comprising:

means for receiving a call from a caller;

means for transmitting a first queue movement offer requiring a payment;

means for transmitting a second queue movement offer requiring a payment with different terms, if the first queue movement offer is declined;

means for receiving a response to the second queue movement offer from the caller;

means, if the response does not indicate an acceptance of the second queue movement offer, for answering the call within a first time period; and means, if the response indicates an acceptance of the second queue movement offer, for answering the call within a second time period that is shorter than the first time period.

116. A system for call processing, comprising:

means for receiving a call from a caller;

means for placing the call in a queue;

means for transmitting an upgrade offer including a payment amount to the caller;

means for receiving an acceptance of the upgrade offer; and means for moving the call up in the queue in response to the received acceptance, thereby moving the call closer to a top of the queue.

117. The system of claim 116, wherein the means for transmitting is responsive to a position of the call in the queue.

118. The system of claim 116, wherein the means for transmitting is responsive to an expected time period of the call in the queue.

119. The system of claim 116, and further including means for receiving an indicator of the payment amount from the caller.

120. A system for call processing, comprising:

means for receiving a call from a caller;

means for placing the call in a queue;

means for transmitting to the caller an upgrade offer including an option to bid for a queue movement;

means for receiving an acceptance of the upgrade offer; and means for moving the call up in the queue in response to the received acceptance, thereby moving the call closer to a top of the queue.

121. A system for call processing, comprising:

means for receiving a call from a caller;

means for placing the call in a queue;

means for transmitting an upgrade offer including an option to select one of a plurality of available positions in the queue in exchange for a corresponding payment amount;

means for receiving an acceptance of the upgrade offer and a selection of one of the plurality of available positions; and means for moving the call up in the queue to the one of the plurality of available positions in response to the received acceptance and the selection, thereby moving the call closer to a top of the queue.

122. A system for call processing, comprising:

means for receiving a call from a caller;

means for placing the call in a queue, the call having a rank in the queue;

means for transmitting an upgrade offer including a payment amount to the caller;

means for receiving an acceptance of the upgrade offer; and means for repositioning, in response to the acceptance, the call in the queue to a higher rank.

123. The system of claim 122, wherein the means for transmitting is responsive to a position of the call in the queue.

124. The system of claim 122, wherein the means for transmitting is responsive to an expected time period of the call in the queue.

125. The system of claim 122, and further including means for receiving an indicator of the payment amount.

126. A system for call processing, comprising:

means for receiving a call from a caller;

means for placing the call in a queue, the call having a rank in the queue;

means for transmitting to the caller an upgrade offer including an option to bid for a queue position;

means for receiving an acceptance of the upgrade offer; and means for repositioning, in response to the acceptance, the call in the queue to a higher rank.

127. A system for call processing, comprising:

means for receiving a call from a caller;

means for placing the call in a queue, the call having a rank in the queue;

means for transmitting an upgrade offer, requiring a payment, to the caller;

means for transmitting periodically to the caller a plurality of subsequent upgrade offers, each requiring a payment, if the upgrade offer is not accepted;

means for receiving an acceptance of one of the plurality of subsequent upgrade offers; and means for repositioning, in response to the acceptance, the call in the queue to a higher rank.

128. A system for call processing, comprising:

means for receiving a call from a caller;

means for placing the call in a queue, the call having a position in the queue;

means for transmitting an upgrade offer including a payment amount to the caller;

means for receiving an acceptance of the upgrade offer from the caller; and means for altering, in response to the acceptance, the position of the call in the queue such that the call may be answered in a shorter period of time that if the position had not been altered.

129. The system of claim 128, wherein the means for transmitting is responsive to a position of the call in the queue.

130. The system of claim 128, wherein the means for transmitting is responsive to an expected time period of the call in the queue.

131. The system of claim 128 and further including means for receiving an indicator of the payment amount.

132. A system for call processing, comprising:

means for receiving a call from a caller;

means for placing the call in a queue, the call having a position in the queue;

means for transmitting to the caller an upgrade offer including an option to bid for a queue position;

means for receiving an acceptance of the upgrade offer from the caller; and means for altering, in response to the acceptance, the position of the call in the queue such that the call may be answered in a shorter period of time that if the position had not been altered.

133. A system for call processing, comprising:

means for receiving a call from a caller;

means for placing the call in a queue, the call having a position in the queue;

means for transmitting to the caller an upgrade offer including an option to select one of multiple available positions in the queue;

means for receiving an acceptance of the upgrade offer from the caller and a selection of one of the multiple available positions; and means for altering, in response to the acceptance, the position of the call in the queue to the selected one of the multiple available positions, whereby the call may be answered in a shorter period of time that if the position had not been altered.

134. The system of claim 133, wherein each of the multiple available positions includes a corresponding fee.

135. A system for call processing, comprising:

means for receiving a call from a caller;

means for placing the call in a queue;

means for transmitting an upgrade offer including a payment amount to the caller while the call is in the queue;

means for receiving an acceptance of the upgrade offer while the call is in the queue; and means for moving the call from the queue to a priority queue in response to the acceptance, the priority queue having a guarantee of response within a predetermined time.

136. The system of claim 135, wherein the means for transmitting is responsive to a position of the call in the queue.

137. The system of claim 135, wherein the means for transmitting is responsive to an expected time period of the call in the queue.

138. The system of claim 135, and further including means for receiving an indicator of the payment amount.

139. A system for call processing, comprising:

means for receiving a call from a caller;

means for placing the call in a queue;

means for transmitting to the caller an upgrade offer including an option to bid for a queue position while the call is in the queue;

means for receiving an acceptance of the upgrade offer while the call is in the queue; and means for moving the call from the queue to a priority queue in response to the acceptance, the priority queue having a guarantee of response within a predetermined time.

140. A system for call processing, comprising:

means for receiving a call from a caller;

means for placing the call in a queue;

means for transmitting an upgrade offer including a payment amount to the caller while the call is in the queue;

means for transmitting to the caller at least one subsequent offer, if the upgrade offer is not accepted;

means for receiving an acceptance of the at least one upgrade offer while the call is in the queue; and means for moving the call from the queue to a priority queue in response to the acceptance, the priority queue having a guarantee of response within a predetermined time.

141. The system of claim 140, wherein the means for transmitting at least one subsequent offer includes means for transmitting the one subsequent offer to the caller a predetermined period of time following the upgrade offer.

142. A system for processing a telephone call, comprising:
means for receiving a telephone call from a caller;
means for placing said telephone call on hold;
means for transmitting to said caller while said telephone call is on hold an offer to shorten the time period said telephone call will be on hold in exchange for a monetary payment;
means for responding to said call, if said offer is not accepted, in a first period of time; and
means for responding to said call, if said offer is accepted, in a second period of time shorter than said first period of time.

143. The system of claim 142, wherein said means for transmitting is responsive to a position of said call in a queue.

144. The system of claim 142, wherein said means for transmitting is responsive to an expected time period of said call on hold.

145. The system of claim 142, and further including means for receiving an indicator of said monetary payment.

146. The system of claim 145, wherein said indicator includes an account number.

147. The system of claim 142, wherein said offer includes an option to bid for a shortened period of time on hold.

148. The system of claim 142, wherein said means for transmitting includes means for transmitting, if said offer is not accepted, at least one subsequent offer having a different monetary payment to said caller.

149. The system of claim 148, wherein said means for transmitting at least one subsequent offer operates at a predetermined period of time following transmission of the offer.

150. A system for call processing, comprising:
means for receiving a telephone call from a caller;
means for placing said telephone call on hold including assigning said telephone call a position in a queue;
means for transmitting to said caller an offer to shorten a time period said telephone call will be on hold in exchange for a payment;
means for receiving an acceptance of said offer, while said call is on hold, including an indication of said payment; and
means for shortening, responsive to said step of receiving an acceptance, said time period.

151. The system of claim 150, wherein said means for transmitting is responsive to a position of said telephone call in said queue.

152. The system of claim 151, wherein said means for transmitting is responsive to said telephone call reaching a selected position in said queue.

153. The system of claim 151, wherein said means for transmitting is responsive to the initial placing of said telephone call in said queue.

154. The system of claim 150, wherein said means for transmitting is responsive to an expected time period of said call on hold.

155. The system of claim 150, wherein said indication of said payment comprises an account number.

156. The system of claim 155, wherein said account number comprises a credit card account number.

157. The system of claim 150, wherein said offer includes an option to bid for a shortened period of time on hold.

158. A system for processing a telephone call, comprising:
means for receiving a telephone call from a caller;
means for placing said telephone call on hold;
means for transmitting to said caller while said telephone call is on hold an offer to bid against other callers to shorten a time period said telephone call will be on hold;
means for receiving a response to said offer; and
means for receiving, if said offer is accepted, an indication of a value of the bid.

159. The system of claim 158, wherein said means for transmitting is responsive to a position of said call in a queue.

160. The system of claim 158, wherein said means for transmitting is responsive to an expected time period of said call on hold.

161. The system of claim 158, wherein said means for receiving an indication of a value includes means for receiving an account number.

162. The system of claim 158, and further including means for, responsive to an acceptance of said offer, moving a position of said telephone call in a queue.

163. The system of claim 158, and further including means for, responsive to an acceptance of said offer, moving said telephone call to a priority queue.

164. A system for accessing a telephone service provider, comprising:
means for placing a telephone call to a service provider;
means for receiving a position on hold in a queue with other telephone callers awaiting access to said service provider;
means for receiving an offer while on hold to decrease a time period in said queue in exchange for a payment;
means for responding to said offer; and
means for receiving, if the responding is an acceptance of said offer, a decrease in said time period for access to said service provider.

165. The system of claim 164, wherein said means for responding to said offer further includes means for providing said payment.

166. The system of claim 165, wherein said means for providing said payment includes means for providing an account number.

167. The system of claim 164, wherein said offer includes an option to bid against other callers for a decrease in said time period.

168. The system of claim 164, wherein said offer includes an option to select one of multiple available positions in a queue.

169. The system of claim 164, and further including means for receiving, if said offer is not accepted, at least one subsequent offer having a corresponding payment amount.

170. A system for accessing a telephone service provider, comprising:
means for placing a telephone call to a service provider;
means for receiving a position on hold in a queue with other telephone callers awaiting access to said service provider;
means for receiving an offer while on hold to bid against other callers to decrease a time period in said queue;
means for responding to said offer; and
means for providing, if said responding is an acceptance of said offer, an indication of a value of the bid.

171. The system of claim 170, wherein said indication of a value includes an account number.

172. A system for call processing, comprising:
a processor;
a memory connected to the processor and including instructions for controlling the processor;

the processor operative with the instructions in the memory to:
receive a call from a caller;
place the call in a queue;
transmit to the caller a queue movement offer including a payment amount;
answer the call within a first time period, if a response to the queue movement offer for the call is not accepted; and
answer the call within a second time period that is shorter than the first time period, if a response to the queue movement offer for the call is accepted.

173. The system of claim 172, wherein the processor is further operative with the instructions in the memory to:
transmit the queue movement offer to the caller in response to a position of the call in a queue.

174. The system of claim 172, wherein the processor is further operative with the instructions in the memory to:
transmit the queue movement offer to the caller in response to an expected time period of the call in a queue.

175. The system of claim 172, wherein the processor is further operative with the instructions in the memory to:
move, if answering the call within the second time period, the call to a different position in a queue.

176. The system of claim 172, wherein the processor is further operative with the instructions in the memory to:
move, if answering the call within the second time period, the call to a different queue.

177. The system of claim 172, wherein the processor is further operative with the instructions in the memory to:
receive an indicator of the payment amount.

178. A system for call processing, comprising:
a processor;
a memory connected to the processor and including instructions for controlling the processor;
the processor operative with the instructions in the memory to:
receive a call from a caller;
place the call in a queue;
transmit to the caller a queue movement offer including an option to bid for a queue movement;
answer the call within a first time period, if a response to the queue movement offer for the call is not accepted; and
answer the call within a second time period that is shorter than the first time period, if a response to the queue movement offer for the call is accepted.

179. A system for call processing, comprising:
a processor;
a memory connected to the processor and including instructions for controlling the processor;
the processor operative with the instructions in the memory to:
receive a call from a caller;
place the call in a queue;
transmit to the caller a queue movement offer including an option to move to a top of a queue in exchange for a payment;
answer the call within a first time period, if a response to the queue movement offer for the call is not accepted; and
answer the call within a second time period that is shorter than the first time period, if a response to the queue movement offer for the call is accepted.

180. A system for call processing, comprising:
a processor;
a memory connected to the processor and including instructions for controlling the processor;
the processor operative with the instructions in the memory to:
receive a call from a caller;
transmit a queue movement offer including a payment amount to the caller;
receive a response to the queue movement offer from the caller;
answer, if the response does not indicate an acceptance of the queue movement offer, the call within a first time period; and
answer, if the response indicates an acceptance of the queue movement offer, the call within a second time period that is shorter than the first time period.

181. The system of claim 180, wherein the processor operation of transmitting is in response to a position of the call in a queue.

182. The system of claim 180, wherein the processor operation of transmitting is in response to an expected time period of the call in a queue.

183. The system of claim 180, wherein the processor operation of answering the call within a second time period includes moving the call to a different position in a queue.

184. The system of claim 183, wherein the processor operation of moving the call to a different position in a queue includes repositioning other calls in the queue.

185. The system of claim 180, wherein the processor operation of answering the call within a second time period includes moving the call to a different queue.

186. The system of claim 180, wherein the processor is further operative with the instructions in the memory to:
receive an indicator of the payment amount.

187. A system for call processing, comprising:
a processor;
a memory connected to the processor and including instructions for controlling the processor;
the processor operative with the instructions in the memory to:
receive a call from a caller;
transmit to the caller a queue movement offer including an option to bid for a queue movement;
receive a response to the queue movement offer from the caller;
answer, if the response does not indicate an acceptance of the queue movement offer, the call within a first time period; and
answer, if the response indicates an acceptance of the queue movement offer, the call within a second time period that is shorter than the first time period.

188. A system for call processing, comprising:
a processor;
a memory connected to the processor and including instructions for controlling the processor;
the processor operative with the instructions in the memory to:
receive a call from a caller;
transmit a queue movement offer including a payment amount to the caller, and if the queue movement offer is declined:
transmit a second queue movement offer with different terms;
receive a response to the second queue movement offer from the caller;

answer the call within a first time period, if the response does not indicate an acceptance of the second queue movement offer; and answer the call within a second time period that is shorter than the first time period, if the response indicates an acceptance of the second queue movement offer.

189. A system for call processing, comprising:

a processor;

a memory connected to the processor and including instructions for controlling the processor;

the processor operative with the instructions in the memory to:
receive a call from a caller;
place the call in a queue;
transmit an upgrade offer including a payment amount to the caller;
receive an acceptance of the upgrade offer; and
move the call up in the queue in response to the received acceptance, thereby moving the call closer to a top of the queue.

190. The system of claim 189, wherein the processor operation of transmitting is in response to a position of the call in the queue.

191. The system of claim 189, wherein the processor operation of transmitting is in response to an expected time period of the call in the queue.

192. The system of claim 189, wherein the processor is further operative with the instructions in the memory to:
receive an indicator of the payment amount from the caller.

193. A system for call processing comprising:

a processor;

a memory connected to the processor and including instructions for controlling the processor;

the processor operative with the instructions in the memory to:
receive a call from a caller;
place the call in a queue;
transmit to the caller an upgrade offer including an option to bid for a queue movement;
receive an acceptance of the upgrade offer; and
move the call up in the queue in response to the received acceptance, thereby moving the call closer to a top of the queue.

194. A system for call processing, comprising:

a processor;

a memory connected to the processor and including instructions for controlling the processor;

the processor operative with the instructions in the memory to:
receive a call from a caller;
place the call in a queue;
transmit to the caller an upgrade offer including an option to select one of a plurality of available positions in the queue in exchange for a corresponding payment amount;
receive an acceptance of the upgrade offer and a selection of one of the plurality of available positions; and
move the call up in the queue to the one of the plurality of available positions in response to the received acceptance and the selection, thereby moving the call closer to a top of the queue.

195. A system for call processing, comprising:

a processor;

a memory connected to the processor and including instructions for controlling the processor;

the processor operative with the instructions in the memory to:
receive a call from a caller;
place the call in a queue, the call having a rank in the queue;
transmit an upgrade offer including a payment amount to the caller;
receive an acceptance of the upgrade offer; and
reposition, in response to the acceptance, the call in the queue to a higher rank.

196. The system of claim 195, wherein the processor operation of transmitting is in response to a position of the call in the queue.

197. The system of claim 195, wherein the processor operation of transmitting is in response to an expected time period of the call in the queue.

198. The system of claim 195, wherein the processor is further operative with the instructions in the memory to:
receive an indicator of the payment amount.

199. A system for call processing, comprising:

a processor;

a memory connected to the processor and including instructions for controlling the processor;

the processor operative with the instructions in the memory to:
receive a call from a caller;
place the call in a queue, the call having a rank in the queue;
transmit to the caller an upgrade offer including an option to bid for a queue position;
receive an acceptance of the upgrade offer; and
reposition, in response to the acceptance, the call in the queue to a higher rank.

200. A system for call processing, comprising:

a processor;

a memory connected to the processor and including instructions for controlling the processor;

the processor operative with the instructions in the memory to:
receive a call from a caller;
place the call in a queue, the call having a rank in the queue;
transmit an upgrade offer, requiring a payment, to the caller, and if the upgrade offer is not accepted:
transmit periodically, a plurality of subsequent upgrade offers, each requiring a payment, to the caller;
receive an acceptance of one of the plurality of subsequent upgrade offers; and
reposition, in response to the acceptance, the call in the queue to a higher rank.

201. A system for call processing, comprising:

a processor;

a memory connected to the processor and including instructions for controlling the processor;

the processor operative with the instructions in the memory to:
receive a call from a caller;
place the call in a queue, the call having a position in the queue;
transmit an upgrade offer including a payment amount to the caller;

receive an acceptance of the upgrade offer from the caller; and alter, in response to the acceptance, the position of the call in the queue such that the call may be answered in a shorter period of time that if the position had not been altered.

202. The system of claim 201, wherein the processor operation of transmitting is in response to a position of the call in the queue.

203. The system of claim 201, wherein the processor operation of transmitting is in response to an expected time period of the call in the queue.

204. The system of claim 201, wherein the processor is further operative with the instructions in the memory to:

receive an indicator of the payment amount.

205. A system for call processing, comprising:

a processor;

a memory connected to the processor and including instructions for controlling the processor;

the processor operative with the instructions in the memory to:
  receive a call from a caller;
  place the call in a queue, the call having a position in the queue;
  transmit to the caller an upgrade offer including an option to bid for a queue position;
  receive an acceptance of the upgrade offer from the caller; and
  alter, in response to the acceptance, the position of the call in the queue such that the call may be answered in a shorter period of time that if the position had not been altered.

206. A system for call processing, comprising:

a processor;

a memory connected to the processor and including instructions for controlling the processor;

the processor operative with the instructions in the memory to:
  receive a call from a caller;
  place the call in a queue, the call having a position in the queue;
  transmit to the caller an upgrade offer including an option to select one of multiple available positions in the queue;
  receive an acceptance of the upgrade offer and a selection of one of the multiple available positions from the caller; and
  alter, in response to the acceptance, the position of the call in the queue to the one of the multiple available positions, whereby the call may be answered in a shorter period of time that if the position had not been altered.

207. The system of claim 206, wherein each of the multiple available positions includes a corresponding fee.

208. A system for processing a telephone call, comprising:

a processor;

a memory connected to said processor and including instructions for controlling said processor;

said processor operative with said instructions in said memory to:
  receive a telephone call from a caller;
  place said telephone call on hold;
  transmit to said caller while said telephone call is on hold an offer to shorten the time period said telephone call will be on hold in exchange for a monetary payment;
  respond to said call, if said offer is not accepted, in a first period of time; and
  respond to said call, if said offer is accepted, in a second period of time shorter than said first period of time.

209. The system of claim 208, wherein said processor operation of transmitting is in response to a position of said call in a queue.

210. The system of claim 208, wherein said processor operation of transmitting is in response to an expected time period of said call on hold.

211. The system of claim 208, wherein said processor is further operative with said instructions in said memory to:

receive an indicator of said monetary payment.

212. The system of claim 211, wherein said indicator includes an account number.

213. The system of claim 208, wherein said offer includes an option to bid for a shortened period of time on hold.

214. The system of claim 208, wherein said processor operation of transmitting includes transmitting, if said offer is not accepted, at least one subsequent offer having a different monetary payment to said caller.

215. The system of claim 214, wherein said processor operation of transmitting at least one subsequent offer is performed a predetermined period of time following said processor operation of transmitting an offer.

216. A system for call processing, comprising:

a processor;

a memory connected to said processor and including instructions for controlling said processor;

said processor operative with said instructions in said memory to:
  receive a telephone call from a caller;
  place said telephone call on hold including assigning said telephone call a position in a queue;
  transmit to said caller an offer to shorten a time period said telephone call will be on hold in exchange for a payment;
  receive an acceptance of said offer, while said call is on hold, including an indication of said payment; and
  shorten, responsive to said step of receiving an acceptance, said time period.

217. The system of claim 216, wherein said processor operation of transmitting is in response to a position of said telephone call in said queue.

218. The system of claim 217, wherein said processor operation of transmitting is in response to said telephone call reaching a selected position in said queue.

219. The system of claim 217, wherein said processor operation of transmitting is in response to the initial placing of said telephone call in said queue.

220. The system of claim 216, wherein said processor operation of transmitting is in response to an expected time period of said call on hold.

221. The system of claim 216, wherein said indication of said payment comprises an account number.

222. The system of claim 221, wherein said account number comprises a credit card account number.

223. The system of claim 216, wherein said offer includes an option to bid for a shortened period of time on hold.

224. A system for processing a telephone call, comprising:

a processor;

a memory connected to said processor and including instructions for controlling said processor;

said processor operative with said instructions in said memory to:
  receive a telephone call from a caller;

place said telephone call on hold;
transmit to said caller while said telephone call is on hold an offer to bid against other callers to shorten a time period said telephone call will be on hold;
receive a response to said offer; and
receive, if said offer is accepted, an indication of a value of the bid.

225. The system of claim 224, wherein said processor operation of transmitting is in response to a position of said call in a queue.

226. The system of claim 224, wherein said processor operation of transmitting is in response to an expected time period of said call on hold.

227. The system of claim 224, wherein said processor operation of receiving an indication of a value includes receiving an account number.

228. The system of claim 224, wherein said processor is further operative with said instructions in said memory to:
move, in response to an acceptance of said offer, a position of said telephone call in a queue.

229. The system of claim 224, wherein said processor is further operative with said instructions in said memory to:
move, in response to an acceptance of said offer, said telephone call to a priority queue.

230. An article of manufacture, comprising:
a computer usable medium having computer readable program code means embodied in the medium for causing a computer to process calls, the computer readable program code means comprising:
computer readable program code means for receiving a telephone call from a caller;
computer readable program code means for placing said telephone call on hold;
computer readable program code means for transmitting to said caller while said telephone call is on hold an offer to shorten the time period said telephone call will be on hold in exchange for a monetary payment;
computer readable program code means for responding to said call, if said offer is not accepted, in a first period of time; and
computer readable program code means for responding to said call, if said offer is accepted, in a second period of time shorter than said first period of time.

231. The article of manufacture of claim 230, wherein the computer readable program code means for transmitting is responsive to a position of the call in a queue.

232. The article of manufacture of claim 230, wherein the computer readable program code means for transmitting is responsive to an expected time period of the call on hold.

233. The article of manufacture of claim 230, wherein the offer includes an option to bid for a shortened period of time on hold.

234. The article of manufacture of claim 230, wherein the computer readable program code means for transmitting includes computer readable program code means for transmitting, if the offer is not accepted, at least one subsequent offer having a different monetary payment to the caller.

235. The article of manufacture of claim 234, wherein the computer readable program code means for transmitting at least one subsequent offer is performed a predetermined period of time following the transmission of an offer.

236. An article of manufacture, comprising:
a computer usable medium having computer readable program code means embodied in the medium for causing a computer to process calls, the computer readable program code means comprising:
computer readable program code means for receiving a telephone call from a caller;
computer readable program code means for placing said telephone call on hold including assigning said telephone call a position in a queue;
computer readable program code means for transmitting to said caller an offer to shorten a time period said telephone call will be on hold in exchange for a payment;
computer readable program code means for receiving an acceptance of said offer, while said call is on hold, including an indication of said payment; and
computer readable program code means for shortening, responsive to said step of receiving an acceptance, said time period.

237. The article of manufacture of claim 236, wherein the computer readable program code means for transmitting is responsive to a position of the telephone call in the queue.

238. The article of manufacture of claim 237, wherein the computer readable program code means for transmitting is responsive to the telephone call reaching a selected position in the queue.

239. The article of manufacture of claim 237, wherein the computer readable program code means for transmitting is responsive to the initial placing of the telephone call in the queue.

240. The article of manufacture of claim 236, wherein the computer readable program code means for transmitting is responsive to an expected time period of the call on hold.

241. The article of manufacture of claim 236, wherein the offer includes an option to bid for a shortened period of time on hold.

242. An article of manufacture, comprising:
a computer usable medium having computer readable program code means embodied in the medium for causing a computer to process calls, the computer readable program code means comprising:
computer readable program code means for receiving a telephone call from a caller;
computer readable program code means for placing said telephone call on hold;
computer readable program code means for transmitting to said caller while said telephone call is on hold an offer to bid against other callers to shorten a time period said telephone call will be on hold;
computer readable program code means for receiving a response to said offer; and
computer readable program code means for receiving, if said offer is accepted, an indication of a value of the bid.

243. The article of manufacture of claim 242, wherein the computer readable program code means for transmitting is responsive to a position of the call in a queue.

244. The article of manufacture of claim 242 wherein the computer readable program code means for transmitting is responsive to an expected time period of the call on hold.

245. The article of manufacture of claim 244, wherein the computer readable program code means further comprises:
computer readable program means for moving, in response to an acceptance of the offer, a position of the telephone call in a queue.

246. The article of manufacture of claim 244, wherein the computer readable program code means further comprises:
computer readable program means for moving, in response to an acceptance of the offer, the telephone call to a priority queue.

* * * * *